(12) United States Patent
Ortner et al.

(10) Patent No.: US 10,329,191 B2
(45) Date of Patent: Jun. 25, 2019

(54) GLASS ROLL, PRODUCT HAVING A GLASS ROLL, DEVICE AND METHOD FOR THE MANUFACTURE THEREOF

(71) Applicant: SCHOTT AG, Mainz (DE)

(72) Inventors: Andreas Ortner, Gau-Algesheim (DE); Andreas Habeck, Undenheim (DE); Clemens Ottermann, Hattersheim (DE); Thomas Roßmeier, Bodenheim (DE); Frank Macherey, Wiesbaden (DE); Jürgen Vogt, Oberheimbach (DE); Rainer Liebald, Nauheim (DE); Thomas Wiegel, Alfeld (DE); Ulrich Battmer, Freden (DE); Uwe Wilkens, Budenheim (DE)

(73) Assignee: SCHOTT AG, Mainz (DE)

( * ) Notice: Subject to any disclaimer, the term of this patent is extended or adjusted under 35 U.S.C. 154(b) by 316 days.

(21) Appl. No.: 15/134,979

(22) Filed: Apr. 21, 2016

(65) Prior Publication Data

US 2016/0311722 A1 Oct. 27, 2016

(30) Foreign Application Priority Data

Apr. 21, 2015 (DE) .......................... 10 2015 106 050

(51) Int. Cl.
 *C03C 17/32* (2006.01)
 *C03C 17/30* (2006.01)
(52) U.S. Cl.
 CPC ............ *C03C 17/322* (2013.01); *C03C 17/30* (2013.01)

(58) Field of Classification Search
 None
 See application file for complete search history.

(56) References Cited

U.S. PATENT DOCUMENTS

| | | | | |
|---|---|---|---|---|
| 3,445,672 | A * | 5/1969 | Marks | G01N 21/896 250/208.4 |
| 3,759,620 | A * | 9/1973 | Cushing | G01N 21/896 250/559.45 |
| 5,642,198 | A * | 6/1997 | Long | G01N 21/8903 356/430 |
| 8,414,993 | B2 * | 4/2013 | Nakazono | B32B 37/22 349/96 |
| 2004/0134231 | A1 * | 7/2004 | Oya | C03B 33/037 65/29.11 |
| 2006/0138323 | A1 * | 6/2006 | Chang | G01N 1/36 250/307 |
| 2007/0199255 | A1 * | 8/2007 | Paquier | E06B 3/66 52/105 |

(Continued)

FOREIGN PATENT DOCUMENTS

| | | |
|---|---|---|
| DE | 10040640 | 3/2002 |
| DE | 102012002174 | 8/2013 |
| WO | 2011014606 | 2/2011 |

*Primary Examiner* — David Sample
(74) *Attorney, Agent, or Firm* — Ohlandt, Greeley, Ruggiero & Perle, L.L.P.

(57) ABSTRACT

A glass roll, as well as a device and a method for manufacturing the glass roll are provided. The glass roll includes a glass ribbon having a thickness, a length in an x-direction, and a width in a y-direction. The glass ribbon has at least one defect site at a position, as well as at least one error mark disposed on the glass ribbon, and is wound up into a glass roll.

16 Claims, 2 Drawing Sheets

(56) References Cited

U.S. PATENT DOCUMENTS

| | | | |
|---|---|---|---|
| 2010/0182560 A1* | 7/2010 | Yoshizawa | C03C 17/32 349/158 |
| 2010/0260964 A1 | 10/2010 | Nakamura et al. | |
| 2012/0301683 A1* | 11/2012 | Li | B65D 85/48 428/192 |
| 2012/0318024 A1* | 12/2012 | Mori | B65H 23/195 65/90 |
| 2012/0327345 A1* | 12/2012 | Inoue | C03C 17/002 349/123 |
| 2014/0347664 A1 | 11/2014 | Schrader et al. | |
| 2015/0218035 A1* | 8/2015 | Ishikawa | C03B 18/02 65/28 |

\* cited by examiner

GLASS ROLL, PRODUCT HAVING A GLASS ROLL, DEVICE AND METHOD FOR THE MANUFACTURE THEREOF

CROSS REFERENCE TO RELATED APPLICATIONS

This application claims benefit under 35 U.S.C. § 119(a) of German Patent Application No. 10 2015 106 050.7 filed Apr. 21, 2015, the entire contents of which are incorporated herein by reference.

BACKGROUND

1. Field of the Invention

The invention relates to a glass roll, a product comprising a glass roll, as well as a device and a method for manufacturing the glass roll.

2. Description of Related Art

Designated as ultra-thin glasses are glasses having a thickness of less than approximately 300 μm, which bend easily, similar to glass fibers, due to their minimal thickness and, in fact, can be wound up to form glass on a roll. The smaller the thickness of the glass is, the more compactly the ultra-thin glass can be wound up. These kinds of glass rolls can comprise several 100s of meters of a glass ribbon. Great advantages result in the further processing of a glass roll in comparison to the processing of sheets, since cutting waste due to sheet size that has not been specified in advance is eliminated. Further, no additional transfer module, such as, e.g., a carrier, is required for supporting the very flexible thin glass sheets.

Ultra-thin glasses have come into use in numerous applications in recent years, in particular, in displays for flat screens or in contact-sensitive displays for tablet computers and smartphones, or also as substrate glasses for OLEDs. Additional products in which thin and ultra-thin glass can be used are, e.g., interposers, thin-film batteries, or capacitors.

By way of example, let us name WO 2011/014606 and US 2010/0260964, in which such glass rolls are disclosed. In WO 2011/014606, it is proposed to coat the two edge regions of a glass ribbon along the lengthwise edges with a flexible material, which projects laterally at least 1 mm beyond the glass ribbon, and which is used for handling the glass ribbon during further processing. The flexible region of the ribbon can have markings or a perforation for the transport and for the positioning of the glass ribbon during the further processing. In US 2010/0260964, it is proposed to laminate a support strip onto one surface of a glass ribbon, this strip projecting out beyond the glass ribbon to provide the other surface of the ribbon with a peelable protective film, and to roll up the laminate that is formed into a glass roll.

During the manufacture of ultra-thin glasses, defect sites of different types may occur, such as, for example, inclusions of bubbles, devitrifications, or inclusions of foreign material, which can result, for example, from batch remnants or tub material. At the present time, individual sheets of special glass or thin glass having defect sites of different types are usually rejected during the manufacture of sheets. For example, in DE 10 2012 002174 A1, a device and a method are disclosed for recognizing defect sites, whereby defect sites of the thin glass affected by defects are sorted out and discarded as rejects. However, in the manufacture of a glass roll, this can lead to the fact that a large quantity of defect-free glass ribbon is also discarded.

Likewise, the glass ribbon can be later subjected to an inspection for defects when the glass roll is unrolled, for example, within the course of a further processing of the glass roll, in which sheets of a prespecified glass roll are to be separated from the glass ribbon. The glass ribbon therefore runs through a defect inspection unit and the defect inspection unit transfers the information on the position of the defect on the glass ribbon to a computer, which calculates optimal cutting positions based on this information as well as the dimensions of sheets to be cut therefrom, and transmits these positions to a cutting unit, which is placed downstream from the defect inspection unit. The cuts are optimized in this way, so that a maximum number of sheets free of defects or with few defects can be manufactured from the continuous ribbon. Sites associated with defects can be cut out. However, it is a disadvantage that only the path between the defect inspection unit and the separating or cutting device is available for optimizing the cutting positions. Therefore, the optimizing can only be conducted over a locally confined region.

Frequently, contaminants of the glass ribbon that are removable, in contrast to defect sites of the glass ribbon, can be distinguished only with difficulty from defect sites in the glass ribbon by the inspection units. Therefore, it may happen that a segment of the glass ribbon containing a contaminant may be erroneously discarded as waste.

SUMMARY

The object of the present invention is to further improve the process during the manufacture and further processing of glass rolls, as well as to provide a corresponding glass roll, a corresponding method and devices.

A first subject of the invention is a glass roll that comprises a glass ribbon having a thickness D, a length L in an x-direction, and a width W in a y-direction. The glass ribbon has at least one defect site $F_i$ at a position $(x_i, y_i)$ and is wound up into a roll. The glass roll has at least one error mark $MF_i$.

The defect site can be disposed, in particular, in a use region at a distance from a lengthwise edge.

The glass roll according to the invention with error markings represents a departure from the prior art, in which segments of the glass ribbon containing defect sites have been discarded as waste. The error mark $F_i^*$ makes possible identifying, for the further processor of a glass roll according to the invention, that section of the glass ribbon containing the defect site that is not to be used for the manufacture of products, since these products could not be manufactured according to specification due to the defect site. The error mark $MF_i$ can be read out during the unrolling of the glass roll in the further processing of the glass roll or of the glass ribbon, and can be considered, in particular, during the separating of the continuous ribbon.

Advantageously, during the further processing, another defect inspection can be correspondingly dispensed with. In addition, waste can be reduced. Waste due to contaminants of the glass ribbon, which are erroneously classified as defect sites, is avoided, since the defect inspection occurs earlier according to the invention, preferably directly after drawing the glass ribbon from the melt and still before rolling up or laminating the glass ribbon. If the layers of the glass ribbon are separated by a removable separating layer, which is joined to the glass ribbon, the error marks can also be disposed on the separating layer. If the glass ribbon also comprises a metal layer or a plastic layer, which is joined to the glass layer, the error marking can also be disposed on this metal layer or plastic layer.

The principal component of the glass roll according to the invention comprises the glass ribbon, which is wound up into at least 2 layers, but preferably more than 10 to more than 1000 layers.

Along at least one of its lengthwise edges, the glass ribbon can have an edge region that extends, starting from its lengthwise edge, in the direction of the center of the ribbon and connects to the edge of the use region of the thin glass. If both lengthwise edges of the ribbon have an edge region, a use region is disposed therebetween. A typical example of such an edge region is a thickened edging. Such an edging is formed by different hot shaping processes, such as drawing the glass ribbon from a melt or also drawing it from a preform.

The glass ribbon according to the invention comprises a film-like glass strip with a thickness of less than 300 µm, preferably a thickness of 10 µm to 250 µm, a width of 1 cm to 300 cm and a length of 1 m to 1000 m, typically 50 m to 500 m. Preferred thicknesses are 15, 25, 30, 35, 50, 55, 70, 75, 80, 100, 130, 145, 160, 190, 210 and 280 µm. The glass can have any chemical composition; for example, it may involve a glass from the group of alkali-free glasses, which are preferably employed for the manufacture of displays and other electrical components, as well as for applications as ultra-thin glass. Of course, however, it may also involve other types of glass, such as borosilicate glasses, aluminoborosilicates, or also highly refractive flat glasses with a refractive index $n_d$ of at least 1.5, as well as soda-lime glasses. Named, for example, are the glasses with the trade names AF 32 eco thin glass, D263 T eco thin glass, B270 i, SG11, Boro33, MEMpax and Xensation® Cover of the Applicant.

In a preferred embodiment, the glass ribbon can also comprise a polymer or metal film, which is joined in fixed manner to the glass strip and forms, together with the glass strip, a glass-plastic laminate, and/or a glass-metal laminate. The film layer that is combined with the glass strip can be sealed flush with the glass strip, it may only cover the use region of the glass ribbon; or preferably, however, it may project laterally beyond the glass strip. Further, the film can be combined either permanently or temporarily with the glass ribbon, and in the latter case can be removed again by suitable measures, such as, e.g., UV irradiation, temperature treatment, or by means of chemical or mechanical action. The term glass ribbon thus always also includes a glass laminate within the scope of this description of the invention.

An intermediate material, which separates the layers of the glass ribbon from each other, can be disposed between the layers of the glass ribbon. The intermediate material can be joined in a removable manner to the glass ribbon or to only to one side of the glass ribbon; likewise, the intermediate material can lie loosely between the layers of the glass ribbon. Further, the glass roll can comprise a cylindrical roll core, whose width approximately corresponds to the width W of the glass ribbon, or is wider. The roll core may be composed of wood, cardboard, metal, plastic, glass, or a composite material, for example.

In this description, when position data points with x and y-coordinates are introduced onto the rolled-up glass ribbon, these data points refer to a rolled-out, planar state of the glass ribbon, wherein the greater dimension of the glass ribbon defines the x-direction and the smaller dimension of the glass ribbon defines the y-direction.

An absolute data point for a longer glass ribbon is possible. Of course, in the x-direction, or lengthwise direction, errors may occur in the positional determination of the glass defect due to slippage in the case of the lengthwise determination. For example, in the case of the length measurement by means of a measuring wheel, a slipping or a change in the contact pressure of the wheel (for example, in the case of a rubber roller) can lead to a deformation and thus to a change in the radius.

Another factor is the thermal expansion of the glass ribbon. A measurement of the lengthwise position can lead to a displacement, depending on the temperature of the glass ribbon. As an example, a glass ribbon is named, in which a glass defect is present at a lengthwise position of 100 meters from the beginning of the glass ribbon. Even in the case of a small linear thermal expansion coefficient of $3 \cdot 10^{-6} K^{-1}$, there results a temperature-dependent defect dx for the determination of the lengthwise position of $dx = 100 \text{ m} \cdot 3 \cdot 10^{-6} K^{-1} = 0.3 \text{ mm/K}$.

According to one embodiment of the invention, the error determination can be easily provided on the ribbon having edge regions in the form of edgings, prior to separating the edgings. The edging geometry (e.g. width) may fluctuate in the case of hot forming. If the edging will be separated later and possibly a cambering of the glass ribbon will be equilibrated thereby, the edging width may fluctuate locally. A y-data point that refers to the edge of this edging is thus less suitable, at least in these cases.

A direct marking on the ribbon is thus particularly favorable for identifying defects at the edge, or in order to avoid uncertainties in the positional determination. This direct marking can also particularly comprise the introduction of positional marks or reference points on the glass ribbon. The positional marks can establish a scale on the glass ribbon. According to an enhancement of the invention, alternatively or additionally, the positional marks can also comprise error marks in the form of information that indicates the layer of a defect site relative to the positional mark, in addition to length or length scale information. In other words, it is thus provided in the enhancement of the invention that a positional mark has readable information on the position of a defect site $F_i$ (4) relative to this positional mark.

The film-like glass strip of the glass ribbon can be manufactured, for example, by a downdraw method, including overflow fusion, by a horizontal drawing method, including floating, or also by a re-drawing process, or a drawing of the glass from a locally heated preform. The edges of such a glass strip usually have a deviating thickness that is greater than the center of the ribbon and usually are also used for pulling off the glass strip during the manufacture. They are also called edgings. The glass ribbon according to the invention can comprise these edgings of the glass strip in the edge regions; thus these edgings are not separated prior to rolling up. The glass ribbon thus has its specification thickness in the use region lying between the edgings. A typical width of an edge region amounts to between 1 cm and 10 cm. Likewise, however, it is possible to separate the edgings prior to rolling up, so that the edge regions of the glass ribbon can have a width of less than 1 cm or only comprise the lateral edge. The glass strips preferably have a fire-polished surface, preferably on both sides.

A defect site is understood to be a glass defect of any type. Glass defects are usually caused by production technology. The person skilled in the art distinguishes between different types of glass defects, such as gaseous and solid inclusions that may be accompanied by deviations in shape. Gaseous inclusions, also called bubbles, usually have a round or elliptical shape, and can be greatly elongated in the drawing direction. In the case of solid inclusions, one distinguishes between transparent, glass-like inclusions and non-transparent inclusions. These may involve, for example, non-molten batch material, tub material, or also crystal inclusions due to devitrification or metal particles. In the case of glass defects, in addition, a distinction is made between glass defects in the interior of the glass ribbon and glass defects that extend up to a surface or solidly adhere to a surface. Particularly critical in general are glass defects in or on the surface of the glass ribbon, since cracks or breaks in the glass usually proceed from the glass surface. Glass defects are to be distinguished from contaminants that can be deposited on the glass ribbon after the manufacturing process and can usually be removed again by appropriate cleaning processes.

An error mark $MF_i$ is preferably disposed in a strip $x_i$–Dx to $x_i$+Dx around the site $x_i$ on the glass ribbon, thus in the immediate vicinity of the defect site. The width 2Dx of this strip typically amounts to between 0.1 mm and 200 mm. Therefore, in the case of intentional or unintentional separation of the glass ribbon, the assignment of error mark $MF_i$ to defect site $F_i$ is not lost. Thus an error mark $MF_i$ is preferably disposed precisely at the x-position $x_i$ of the defect site. Likewise, an error mark $MF_i$ can be can be systematically shifted in the x-direction, opposite the defect site $F_i$ so that when the glass ribbon is unrolled, the error mark $MF_i$ is easily visible in front of the defect site $F_i$. The following processes, such as an additional defect inspection or a separation can be correspondingly better optimized. For better discernment of the error marks, the latter can be made in color and/or by fluorescence. If the glass ribbon has, in addition to the glass strip, a plastic layer or metal layer, which preferably projects laterally beyond the glass strip, the error mark can also be disposed on the plastic layer or metal layer.

Based on the very different manifestations and effects of the different types of defects, the error mark is preferably formed so that it comprises information on the type of defect. A specific type of defect may be unacceptable for a first use of the glass ribbon, but the same type of defect of the glass ribbon can be totally acceptable for another use. The identification of the type of defect thus makes possible an optimal utilization of the glass ribbon dependent on its use. Thus, for example, it is possible to combine or summarize the glass defects into classes I, II, III, . . . , n, wherein the error mark $MF_i$ is designed so that it indicates the class of the glass defect. For example, class I may comprise bubble inclusions; class II, solid inclusions; and class III, mechanical damage of the glass ribbon. Further, the lateral dimension of the defect, particularly in the case of bubbles, can be categorized, so that here also, a yield-optimized cutting optimization can be conducted corresponding to the later requirements for the product.

Most of the glass defects have a very small dimension of clearly less than 1 mm. If the defects extend over a larger region in the x or y-direction, then an error mark $MF_i$ is preferably designed so that it comprises information on the position ($x_i$, $y_i$) and/or the size of the defect $F_i$. Thus, for example, the error mark can be a dashed marking line, which extends physically over the entire length of the defect site in the x-direction, so that the ribbon segment affected by the defect site is directly visible. A marking line can also be designed in color and/or fluorescent. Likewise, information on the position ($x_i$, $y_i$) and the size of the defect site in the x and y-directions can be printed in a machine-readable code. [see the remarks above on this subject relative to slippage and dimension]

In a preferred embodiment, the glass ribbon has at least one positional mark $P_0$. The positional mark $P_0$ makes possible an absolute position indication that relates to the positional mark $P_0$ for any site on the glass ribbon. Preferably, the glass ribbon has additional positional marks $P_i$, which are disposed at equidistant intervals along one lengthwise edge, and which are preferably designed so that they identify the precise position of the mark, and comprise a lettering with information on the x-position $x_i$ of the positional mark. The positional mark can comprise, e.g., a printed lettering with a "+" sign, which represents the precise position, as well as a string that reproduces the x-position for this position, such as, e.g., the lettering "+2.0 m". The distance between two sequential positional marks can amount to precisely 1.00 m, for example. In addition, a start mark that contains, e.g., an identification number of the glass roll, can be disposed on the glass ribbon.

If the glass ribbon has, in addition to the glass strip, a plastic layer or metal layer, which preferably projects laterally beyond the glass strip, the error mark and/or the start mark can also be disposed on the plastic layer or metal layer.

In a preferred embodiment, positional marks and/or error marks are made as laser engraving, stickers, laser-assisted diffusion or as an ink imprint. Common marking methods are characterized in that they can be introduced very rapidly, and in the case of laser engraving, laser-assisted diffusion and ink-jet, they can also be introduced without contact. In the case of laser engraving, it is unfavorable, of course, if the surface (OF) is damaged thereby, which can lead to breaks during bending or rolling up the ribbon. Thus, for engraving, the printed side, i.e., the inner side of the ribbon, on the roll would be preferred, and then the loaded side would be specified for bending, but also this side would no longer be freely selectable by the customer. Laser embossing is still possible in the neutral phase of the glass. The named methods are thus also suitable for marking a rapidly moving glass ribbon, without needing to impede or interrupt the transport thereof. Laser-assisted diffusion is characterized by the application of a medium containing coloring and/or fluorescing ions onto the glass surface and intensely heating for a short time by means of a laser, whereby the coloring ions diffuse into the glass surface. In contrast to stickers, which are preferably removable without leaving remnants, these types of markings by laser-assisted diffusion cannot be removed.

The marks are preferably disposed in one of the two edge regions in order to avoid contamination when an application marking method is used, or to avoid damage of the use region when a deposition marking method is used. The error mark is thus separated from the defect site, which lies in the use region. The marks are preferably made machine-readable. The mark may be a one-dimensional bar code or a two-dimensional, so called data matrix code.

In addition, the positional marks can be disposed at a first, fixed distance from the edge, and the error marks can be disposed at a second, fixed distance from the edge, in each case inside the edge region, which simplifies the machine reading of the marks.

In a preferred embodiment, at least one defect site $F_i$ in the use region of the glass ribbon is protected by a protective means, which is disposed locally on the defect site $F_i$. A local disposition of the protective means is understood here to mean that the glass ribbon is not coated entirely or over a large surface area, but rather only in a surface region around the defect site, having an area of approximately 1 mm² to 100 cm², preferably 1 to 10 cm². Some types of glass defects can almost leave the mechanical strength of the ribbon unchanged, but some types of glass defects represent a strong mechanical weakening of the glass ribbon and can be the starting point for cracks of the glass ribbon. The glass ribbon is placed under stress during the winding-up process, so that tearing of the ribbon can occur, in particular, during the winding-up process or also during storage or during unwinding. This tearing may proceed preferably from glass defects. The glass ribbon is locally reinforced by the protective means that is disposed locally on the defect site A1, so that a break is avoided. The protective means preferably completely covers the defect site in this case. In addition, the protective means is also preferably disposed in a region around the defect site and extends up to a distance of 1 mm to 5 cm from the defect site.

Thus, for example, a polyvinyl alcohol such as Mowiol® of the Clariant company, a polydimethylsiloxane such as ElastoSil® of the Wacker company, or tetramethylsilane (TMS), or a silicone resin such as Silres® of the Wacker Chemie company can be introduced onto a defect site and thermally hardened. Also, however, ceramic coatings such as, e.g., sol-gel layers that are calcined, e.g., thermally or by means of laser firing, can be solidly joined to the glass region around the defect site. The layer thickness in this case can lie in a range from 1 µm to more than 100 µm, typically 10 to 60 µm. Therefore, a clear increase in strength can be achieved.

Preferably, the protective layer is formed so that the surface of the glass ribbon is placed under a compressive stress of at least 50 MPa in the region of the defect site, whereby a breaking of the glass ribbon can be particularly well avoided. For t=50 µm for AF32 (E=74 GPa) and a diameter of curvature of D=100 mm, which corresponds to a typical request by the post-processor, a bending stress of $\sigma=E*t/D=37$ MPa results. On a storage roll having a diameter of D=500 mm, $\sigma$ still amounts to only approximately 7 MPa. If the compressive stress is indicated in relative terms, i.e., for example: "a fourth of the bending load expected in the further application, however, then the bending stress amounts to at least 5 MPa, preferably 10 MPa". The protective layer then correspondingly is placed under a tensile stress. This clear covering of the defect and thus its reinforcement presumes a clear requirement for the defect specification of the later glass application. The above-discussed decision of whether defects are relevant in a subsequent cutting optimization based on categories for the respective product is no longer possible here.

Preferably, the protective means comprises a layer composed of a UV-cured coating or UV-cured adhesive. The UV-curing can occur within very short hardening times, and, except in the case of thermally curable material systems, the hardening process is independent of the temperature of the glass ribbon. In this case, a two-component polyurethane coating system comprising diisocyanates and polyisocyanates such as Desmodur® of the Bayer company and polyols such as Desmophen® of the Bayer company as the second component, which joins with the polyurethane coating by poly addition, is particularly preferred. The coating system has a very low viscosity and a good creep behavior during application and can be applied, e.g., by spraying. It can be hardened very rapidly by UV curing and then possesses a high impact strength, elasticity, and temperature stability. Therefore, defect sites can be reliably wetted to fill cracks and avoid breaks. Likewise, the protective means can comprise an adhesive tape having a support layer and an adhesive layer. In contrast to the UV-curing coating system, the adhesive tape can easily come into contact with foreign material prior to the hardening, and, e.g., this can be wound up directly into a glass roll.

The protective layer is preferably disposed only on the convex outer side of the rolled-up glass ribbon, which is generally under tensile stress due to the rolling up, and is particularly at risk of breaking. A protective layer, however, can also be introduced in the region of the defect site on both sides of the glass ribbon, especially since tensile stresses may occur on both sides of the glass ribbon during the further processing of the glass ribbon. If the defect site extends up to one of the two surfaces of the glass ribbon, the protective layer also can be disposed preferably only on this surface.

In another preferred embodiment, an error mark $MF_i$ is not disposed in the edge region, but rather in the use region at the position $(x_i, y_i)$ of the defect site $F_i$ belonging thereto, whereby this site preferably simultaneously comprises the protective means. Therefore, the error mark $F_i^*$ simultaneously protects the defect site. For example, it may be a sticker than can bear an imprint. An error mark in the edge region can be omitted. However, it is also the case that the edge region can be completely omitted. Since the defect site is directly labelled, the error mark at the edge is dispensed with, and a positional marking is also not required, since a displacement between the defect and the mark cannot occur here due to slippage and changes in expansion. The glass ribbon can thus be delivered in the form of a roll with a 100% quality region. The removal of the edge region/edge regions and thus a significant process step on the part of the customer is therefore dispensed with. This is another advantage of this special marking technique discussed here.

In a preferred embodiment, the layers of the rolled-up glass ribbon can also be separated by a separating layer, whereby the marks are preferably disposed on the separating layer and not on the glass ribbon. Since the marking is not directly disposed on the glass ribbon, a contamination or mechanical weakening of the glass ribbon is avoided thereby. The separating layer is preferably joined to the glass ribbon in a removable manner. In particular, it can be a so-called adhesion film, which adheres to the glass ribbon only on the basis of adhesion forces, and in this way, on the one hand, can be removed by pulling off without leaving a remnant, and, on the other hand, cannot be displaced relative to the glass ribbon. In this way, the precise positional assignment of the error marks remains on the separating layer and maintains the defect sites pertaining thereto.

The subject of the invention is also a product, which comprises a glass roll and a data record, wherein the glass roll comprises a glass ribbon having a thickness D, a length L in an x-direction and a width W in a y-direction, wherein, along at least one of its lengthwise edges, the glass ribbon has an edge region that extends, starting from its lengthwise edge, in the direction of the center of the ribbon and connects to the one use region, wherein the glass ribbon has at least one defect site $F_i$ at a position $(x_i, y_i)$ in the use region, wherein at least one first positional mark $P_0$ at a position $(x_0, y_0)$ is disposed on the glass ribbon, and wherein the glass ribbon is wound up into a roll, and wherein the data record can be unambiguously assigned to the glass roll and comprises at least the information on the x-position of the defect site $x_i$. The information on defect sites thus need not be disposed on the glass roll itself in the form of at least one error mark, but can also be provided in a data record that is assigned to the glass roll.

The assignment of the glass roll to the data record may be made of an identification number, for example, which is introduced on the glass roll, whereby the data record makes reference to this identification number. The glass roll and the defect information can thus be separated from one another. In this embodiment, error marks introduced onto the glass ribbon can be dispensed with, whereby contaminants and mechanical weakening of the glass ribbon due to the introduced marks also can be avoided. Of course, at least one positional mark $P_0$ must be present on the glass ribbon, which makes possible a positional data point or localization of the defect site on the glass ribbon. Preferably, additional positional marks are disposed at equal distances on the glass ribbon, preferably in an edge region. Preferably, in addition to the x-position of the defect site, the data record also comprises information on the y-position of the defect site as well as on the size and type of the defect site.

The product comprising a glass roll and a data record further enables access to the information on defect sites without physical access to the glass roll. Therefore, a yield for a specific cut can be readily calculated in advance from the defect information present prior to processing and physical access to the glass roll. If several products with different cuts are to be manufactured from a number of glass rolls, an optimal assignment of glass rolls to specific products or manufacturing orders can be produced also. Therefore, a reduction in waste, a more precise prediction of yields, and a higher precision are possible overall when commissioning orders.

The data record typically comprises a list of defect sites, wherein, preferably the following are indicated for each defect site: the position of the defect site with reference to the positional mark $P_0$, the type of defect site, and the extent of the defect site in the x and y-directions. Further, the data record typically comprises an identification number, which makes possible a clear assignment of the data record to the glass roll associated therewith.

According to another alternative or additional embodiment, however, the data record can also be applied on the roll (e.g., at the beginning of the glass ribbon) or can be joined solidly to the roll (e.g., on a preceding handling aid such as a leader tape).

The data record can be found, for example, on a data medium that accompanies the glass roll or is joined to the glass roll, or is fastened to it. These data media may be commercially available optical disks such as CDs or DVDs, magnetic data media such as diskettes, memory cards, or the like. Likewise, the data record can be available also to a further processor of the glass roll for transmission, e.g., over the internet. The product thus comprises correspondingly the glass roll plus the data medium containing the data record that is assigned to the glass roll.

The data record can also be stored on an RFID chip, so that the data can be read out electronically and contact-free.

The present invention, in addition, also relates to a device for manufacturing a glass roll according to the preceding claims. The device according to the invention comprises a transport device for conveying the glass ribbon, an inspection unit for detection of defect sites $F_i$ in the glass ribbon, as well as a marking unit for marking the glass ribbon with positional marks and error marks.

The inspection unit can be designed, for example, according to the Offenlegungsschrift (Unexamined Patent Application) DE 10 2012 002174 of the Applicant. The latter comprises at least one lighting device with which a portion of the glass ribbon is illuminated, an image recording means for capturing an image of the glass ribbon, as well as an evaluation unit that determines position, type, as well as size of defect sites on the basis of image information. The marking unit can comprise, for example, an inkjet printer or also a laser unit. Likewise, it may be a unit that introduces adhesive on the glass ribbon. The evaluation unit that determines the defect sites is connected to the marking unit via a control unit.

In a preferred embodiment, the device further comprises a coating unit that is designed so that it can introduce a local protective layer onto a defect site $F_i$ in the use region. The coating unit can comprise, for example, a spray nozzle that applies a UV-curable coating or adhesive onto the glass ribbon, as well as a downstream hardening unit with a UV light source.

The invention further comprises a method for manufacturing the glass roll according to the invention, comprising the following process steps: continuously supplying a glass ribbon that can be wound up at a speed v; determining the positions $(x_i, y_i)$ of defect sites $F_i$ on the glass ribbon by means of an inspection unit; placing at least one error mark on the glass ribbon with a marking unit, whereby the error mark is preferably disposed in a strip $x_i-Dx$ to $x_i+Dx$ around the x-position $x_i$ of the defect site; and winding up the glass ribbon (1) into a glass roll.

The supplying of the glass strip of the glass ribbon is preferably made directly in the form of a film-like glass strip from a glass melting process or the subsequent hot forming. Likewise, the film-like glass strip can be supplied by means of a redrawing process of a preform. The glass strip can also be laminated with polymer and/or metal film before or after the marking of the glass ribbon, so that the glass strip is a laminate. The glass ribbon is preferably supplied at a constant speed v, whereby typical speeds amount to between 0.1 and 100 m per minute. The glass ribbon is introduced into an inspection unit, which determines the positions $(x_i, y_i)$ of defect sites $F_i$ on the ribbon, and is transferred to a marking unit. The marking unit places at least one error mark on the glass ribbon according to the determined defect sites, whereby the error mark is preferably disposed in a strip $x_i-Dx$ to $x_i+Dx$ around the x-position $x_i$ of the defect site. The glass ribbon can also be laminated with polymer and/or metal film before or after the marking. Finally, the glass ribbon is wound up into a glass roll.

In a preferred embodiment of the method, the marking unit further places at least one positional mark $P_0$, and preferably additional positional marks $P_i$, at equidistant intervals.

In another preferred embodiment of the method, a protective means is introduced locally on a defect site $F_i$.

In another preferred embodiment of the method, the information on the position $(x_i, y_i)$ of defect sites $F_i$ is recorded in a data record and stored on a data medium that is assigned to the glass roll, for example, via an identification number.

DESCRIPTION OF THE FIGURES

The invention will be explained in more detail in the following on the basis of the appended figures as well as concrete examples of embodiment. Herein.

DETAILED DESCRIPTION

Figure 1:
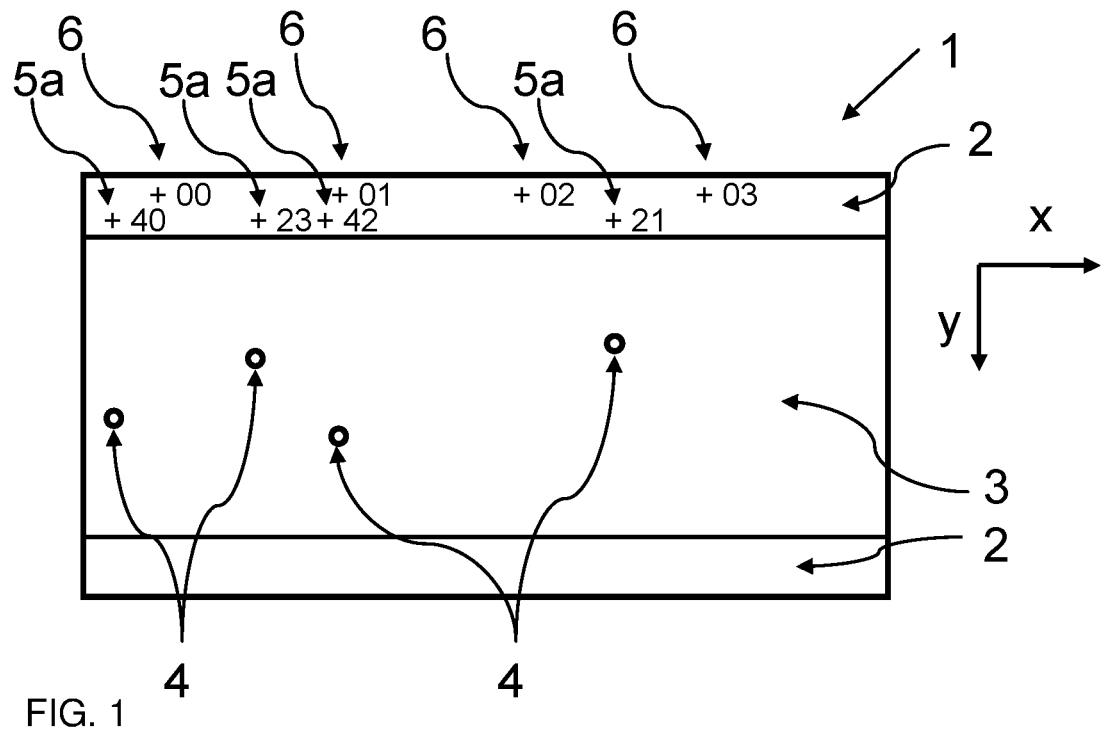
FIG. 1 shows a schematic representation of a first glass roll according to the invention.

FIG. 1 shows a schematic representation of a section of a first glass roll according to the invention, wherein the glass ribbon (1) is shown in a flat state, not rolled up. The glass ribbon (1) has a width W in a y-direction and a length in an x-direction, as well as two edge regions (2) along its lengthwise edges; these edge regions extend, starting from the lengthwise edge, in the direction to the center of the ribbon, and a use region (3) is disposed between them. The glass ribbon (1) further has four defect sites $F_i$ (4) in the use region (3), as well as four error marks $MF_i$ (5a). The error marks lie in an edge region at the x-position of the respective defect $x_i$ and are formed as a lettering that comprises a "+" sign for the precise positional data point of the defect site and a number that indicates the y-position of the defect $y_i$ on the glass ribbon. In the schematic example, the error marks are printed as readable clear text, thus not simply as machine-readable code. Further, a first positional mark (6) is disposed at the x-position "0", as well as additional positional marks (6) at equidistant intervals. The positional marks are formed as lettering that comprises a "+" sign for the precise positional data point, as well as the respective x-position relative to the first positional mark. The positional marks are disposed at a first fixed distance from the edge of the glass ribbon, and the error marks are disposed at a second fixed distance from the edge of the glass ribbon.

Figure 2:
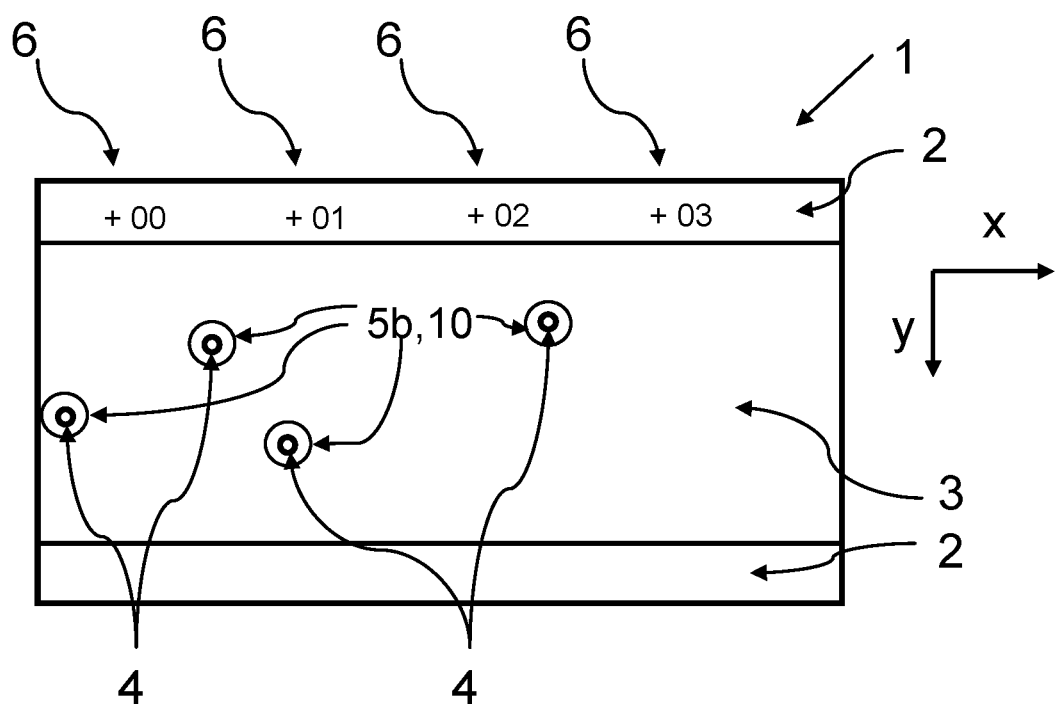
FIG. 2 shows a schematic representation of a glass ribbon according to the invention.

FIG. 2 shows a second exemplary embodiment, wherein the glass ribbon is also shown in a flat state, not rolled up. This exemplary embodiment is distinguished from the first exemplary embodiment by the fact that a protective layer (10) is disposed on each of the defect sites (4), and there are no error marks in the edge region (2). Instead of this, the protective layer (10) simultaneously shows the error mark (5b).

Figure 3:
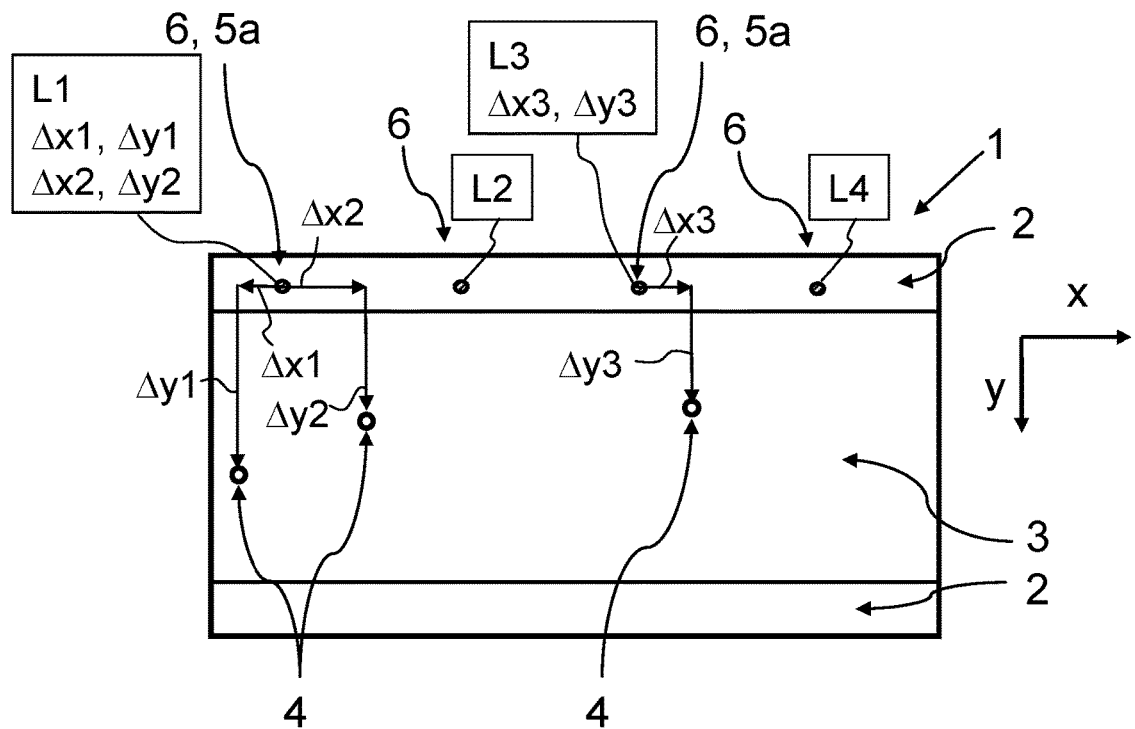
FIG. 3 shows a variant of the embodiment of a glass roll according to the invention shown in FIG. 1, in which defect markings are integrated into positional marks.

A variant of the embodiment shown in FIG. 1 is represented in FIG. 3. The exemplary embodiment of FIG. 3 is based on the fact that again several equidistant positional marks (6) are provided, whereby at least one positional mark (6) has readable information on the position of a defect site Fi (4) relative to the positional mark (6). Seen from left to right in the example shown, the first and third positional marks 6 contain readable information on the position of a total of three defect sites (4). In addition to the length information L1 that characterizes the length position or x-position of the positional mark (6), the first positional mark also contains the x and y coordinates ($\Delta x1$, $\Delta y1$), ($\Delta x2$, $\Delta y2$) of two defect sites. These coordinates, as stated, can be indicated in particular relative to the position of the positional mark (6). The position of the positional mark is thus given by its y-position and the lengthwise position L1. An indication of the lengthwise position L1 is not absolutely necessary, since a specific lengthwise position can always also be determined by counting the positional marks in the lengthwise direction of the glass ribbon. As shown, with the lengthwise position L3, the positional mark also contains readable coordinates ($\Delta x3$, $\Delta y3$) of a defect site (4). Accordingly, the positional marks (6) can contain no, one, or even several readable data points on the coordinates of defect sites. The coordinates of defect sites (4) can additionally be provided on a data medium, as mentioned above.

Figure 4:
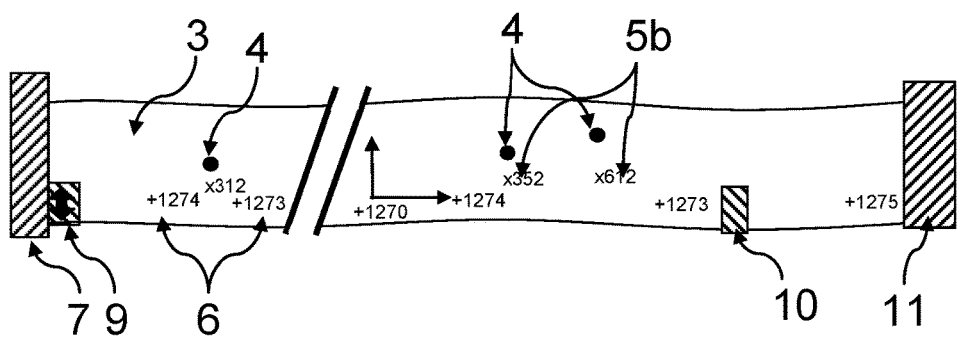
FIG. 4 shows a schematic representation of a device for manufacturing a glass roll according to the invention.

FIG. 4 schematically shows a device for manufacturing a glass roll (1) according to the invention, comprising a transport device (11) for conveying the glass ribbon (1), an inspection unit (7) for the detection of defect sites $F_i$ (4) in the glass ribbon (1), and a marking unit (9) for marking the glass ribbon (1) with positional marks $P_O$ (6) and error marks $MF_i$ (5a, 5b). Further, the device can comprise a reader unit (10), which reads the marks. The transport device (11) can be designed simultaneously as a wind-up unit, which winds up the glass ribbon into a glass roll. The units are connected together via a device control that is not shown. In FIG. 4 it is shown that the outer form of the glass ribbon can also deviate from an ideal rectangular shape. Thus, the lateral edges may have, e.g., a wavy form, which is shown schematically in FIG. 4. Two sequential positional marks in this case define the x-direction and cover a coordinate system with the y-direction perpendicular thereto. The lateral edge of the glass ribbon thus does not always run precisely parallel to the x-direction.

The invention claimed is:

1. A glass roll comprising:
a glass ribbon having a thickness, a length in an x-direction, and a width in a y-direction, the glass ribbon having at least one defect site at a position defined in the x and y directions, the glass ribbon being wound up into a roll, the glass roll having at least one error mark that identifies the position of the defect site and has a plurality of equidistant positional marks disposed along a lengthwise edge and within the width of the glass ribbon, the plurality of equidistant positional marks comprising information on a location in the x-direction of each of the plurality of positional marks.

2. The glass roll of claim 1, wherein the glass roll comprises a use region distanced in the y-direction from a lengthwise edge, the position being in the use region.

3. The glass roll of claim 1, wherein the at least one error mark identifies the position in the x-direction of the glass ribbon of the defect site.

4. The glass roll of claim 1, wherein the glass ribbon comprises at least one lengthwise edge extending along the x-direction, an edge region that extends from the lengthwise edge in the y-direction, and a use region connected to the edge region.

5. The glass roll of claim 1, wherein the error mark is disposed in a strip along the x-direction.

6. The glass roll of claim 1, wherein the error mark comprises information on the position, an error type of the defect site, and a size of the defect site.

7. The glass roll of claim 1, wherein at least one of the plurality of positional marks has readable information on the position of the defect site relative to the positional mark.

8. The glass roll of claim 1, wherein the plurality of positional marks and/or the at least one error mark comprise marks selected from the group consisting of laser engraved marks, sticker marks, laser-assisted diffused ink marks, ink imprint marks, and machine-readable marks.

9. The glass roll of claim 2, wherein the at least one defect site in the use region is protected by a protector that is disposed locally on the defect site.

10. The glass roll of claim 9, wherein the protector comprises a layer of a UV-cured coating or UV-cured adhesive.

11. The glass roll of claim 9, wherein the protector is disposed only on a convex outer side of the roll.

12. The glass roll of claim 1, further comprising a separating layer between layers of the roll, wherein the at least one error mark is disposed on the separating layer.

13. A product comprising the glass roll of claim 1 and a data record unambiguously assigned to the glass roll, the data record having at least information on the position of the at least one defect site.

14. The product of claim 13, wherein the data record is found on a data medium or on the glass ribbon.

15. A glass roll comprising:

a glass ribbon having a thickness, a length in an x-direction, and a width in a y-direction, the glass ribbon having at least one defect site at a position defined in the x and y directions, the glass ribbon being wound up into a roll, the glass roll having at least one error mark that identifies the position of the defect site; and a plurality of equidistant positional marks disposed along a lengthwise edge, wherein at least one of the plurality of positional marks has readable information on the position of the defect site relative to the positional mark.

16. A glass roll comprising:

a glass ribbon having a thickness, a length in an x-direction, and a width in a y-direction, the glass ribbon having at least one defect site at a position defined in the x and y directions, the glass ribbon being wound up into a roll, the glass roll having at least one error mark that identifies the position of the defect site, wherein the glass roll comprises a use region distanced in the y-direction from a lengthwise edge, the position being in the use region, wherein the at least one defect site in the use region is protected by a protector that is disposed locally on the defect site, and wherein the protector is disposed only on a convex outer side of the roll.

* * * * *